United States Patent [19]

Ida

[11] Patent Number: 4,556,908
[45] Date of Patent: Dec. 3, 1985

[54] SOLID STATE IMAGE SENSOR

[75] Inventor: Masatoshi Ida, Tokyo, Japan

[73] Assignee: Olympus Optical Co., Ltd., Tokyo, Japan

[21] Appl. No.: 454,052

[22] Filed: Dec. 28, 1982

[30] Foreign Application Priority Data

Jan. 11, 1982 [JP]  Japan .................................. 57-2498

[51] Int. Cl.[4] ............................................ H01N 5/26
[52] U.S. Cl. .................................. 358/212; 358/213; 358/228
[58] Field of Search ............... 358/213, 212, 228, 221, 358/227, 211, 906; 356/219

[56] References Cited

U.S. PATENT DOCUMENTS

| Re. 31,370 | 9/1983 | Mashimo et al. | 354/230 |
|---|---|---|---|
| 3,830,972 | 8/1974 | McHugn et al. | 358/213 |
| 4,320,780 | 11/1981 | Yamazaki et al. | 358/228 |
| 4,321,462 | 3/1982 | Numata | 250/211 J |
| 4,420,773 | 12/1983 | Toyoda et al. | 358/335 |

FOREIGN PATENT DOCUMENTS

| 0053918 | 4/1979 | Japan | 358/213 |
|---|---|---|---|
| 0044271 | 4/1981 | Japan | 358/213 |

Primary Examiner—Thomas W. Brown
Assistant Examiner—Robert G. Lev
Attorney, Agent, or Firm—Frishauf, Holtz, Goodman & Woodward

[57] ABSTRACT

A solid state image sensor comprises an image sensing matrix comprised of a number of photoelectric elements arranged in a matrix array and a scanning circuit for two-dimensionally scanning the image sensing matrix by scanning signals to extract image signals. Picture element selection circuits are connected to horizontal and vertical lines of the image sensing matrix to pick up the output signals of photoelectric elements as photometric signals.

6 Claims, 5 Drawing Figures

SOLID STATE IMAGE SENSOR

BACKGROUND OF THE INVENTION

This invention relates to a solid state image sensing apparatus and in particular to a solid state image sensor used for an electronic still camera.

A solid state image sensor is used for a television camera, etc. In the television camera, a number of photoelectric elements which are arranged in a matrix array are scanned by vertical and horizontal scanning signals to pick up image signals from the solid state image sensor. Where the brightness of a subject is to be measured by the solid state image sensor before it is photographed, the solid state image sensor matrix is scanned, as in an image pick-up operation, by horizontal and vertical scanning signals and the amount of light on the subject is measured on the basis of image signals obtained by the scanning operation. Where the brightness of a specific portion of the subject is to be measured according to such a photometric system, it is possible to effect only one photometric operation for each single scanning period. There is a problem, then, with the speed at which such a photometic operation can be performed. Furthermore, it is not possible to simultaneously measure the brightness of a plurality of specific portions of the subject.

SUMMARY OF THE INVENTION

It is accordingly the object of this invention to provide a solid state image sensor which can rapidly measure the brightness of one or more portions of a subject.

According to the solid state image sensor of this invention, in addition to horizontal and vertical scanning means, picture element selection means are also provided, whereby any arbitrary picture element or elements are selected to permit the brightness of a specific portion of a subject to be measured by the signal or signals of the selected picture element or elements.

DETAILED DESCRIPTION OF THE PREFERRED EMBODIMENT

Figure 1:
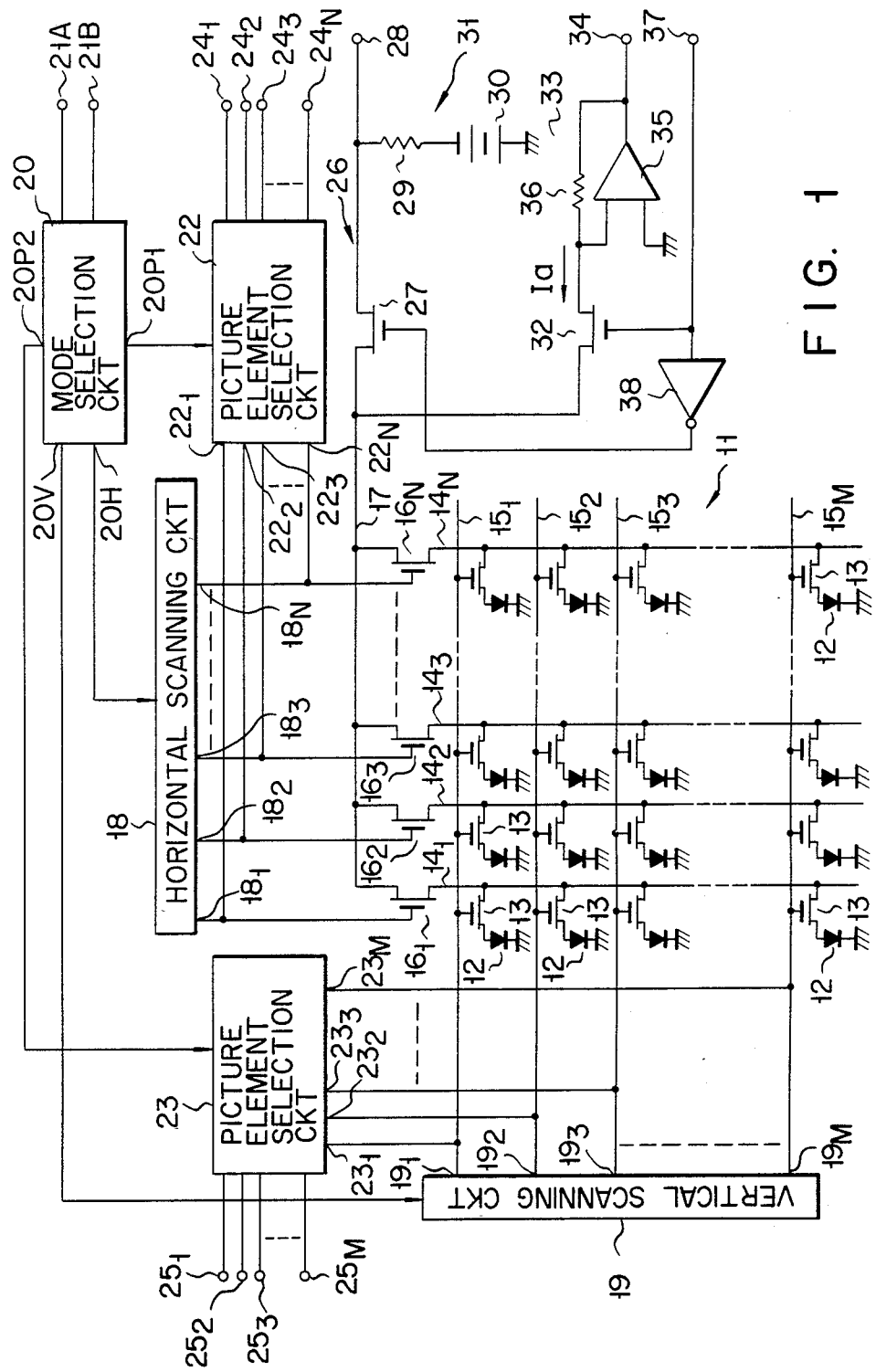
FIG. 1 shows a circuit diagram of a solid state image sensor according to one embodiment of this invention.

As shown in FIG. 1, an image sensing matrix 11 comprises a plurality of photoelectric elements 12 arranged in a matrix array and a corresponding number of switching elements such as MOS transistors 13. The anode of each photoelectric element 12 is connected to one electrode of each MOS transistor 13. The cathod of each respective photoelectric element 12 is grounded. Each of the horizontal scanning lines $14_1$ to $14_N$ is connected to the other electrode of each of the MOS transistors 13 arranged in the column direction. Each of vertical scanning lines $15_1$ to $15_M$ is connected to the gate electrode of each of the MOS transistors 13 arranged in the row direction. The horizontal scanning lines $14_1$ to $14_N$ are connected to an output line 17 through the source-drain paths of switching elements, e.g., MOS transistors $16_1$ to $16_N$. The gate electrodes of the MOS transistors $16_1$ to $16_N$ are connected to corresponding output terminals $18_1$ to $18_N$ of a horizontal scanning circuit 18. Output terminals $19_1$ to $19_M$ of a vertical scanning circuit 19 are connected to the corresponding vertical scanning lines $15_1$ to $15_M$. A mode selection circuit 20 is arranged to select a photographing mode or a photometry mode according to a selection signal of selection signal input terminals 21A and 21B. Horizontal and vertical output terminals 20H and 20V of the mode selection circuit 20 are connected to the input terminals of the horizontal and vertical scanning circuits 18 and 19, respectively. Picture element selection terminals 20P1 and 20P2 of the mode selection circuit 20 are connected to the driving terminals of picture element selection circuits 22 and 23, respectively. Output terminals $22_1, 22_2, \ldots,$ and $22_N$ of the picture element selection circuit 22 are connected to the gates of the corresponding MOS transistors $16_1, 16_2, \ldots, $ and $16_N$, respectively. Output terminals $23_1, 23_2, \ldots,$ and $23_M$ of the picture element selection circuit 23 connected to the vertical scanning lines $15_1, 15_2, \ldots,$ $15_M$, respectively. The input terminals of the picture element selection circuit 22 are connected to picture element selection circuits $24_1$ to $24_N$. Similarly, the input terminals of the picture element selection circuit 23 are connected to picture element selection signal input terminals $25_1, 25_2, 25_3, \ldots, 25_M$.

The output line 17 is connected to an image signal output terminal 28 through the source-drain path of an FET (a switching circuit) 27 of an output circuit 26. An image signal pick-up circuit comprised of a series circuit having a resistor 29 and power source 30 is connected between the output terminal 28 and ground. The output line 17 is connected to a photometric signal output terminal 34 through a switching element (e.g., an FET) 32 and photometric signal amplifier circuit 33. The amplifier circuit 33 is comprised of an operational amplifier 35 and a resistor 36. A control signal input terminal 37 is connected to the gate of the FET 32 and, through an inverter 38, to the gate of the FET 27.

The operation of the solid state image sensor will be explained below.

Figure 2:
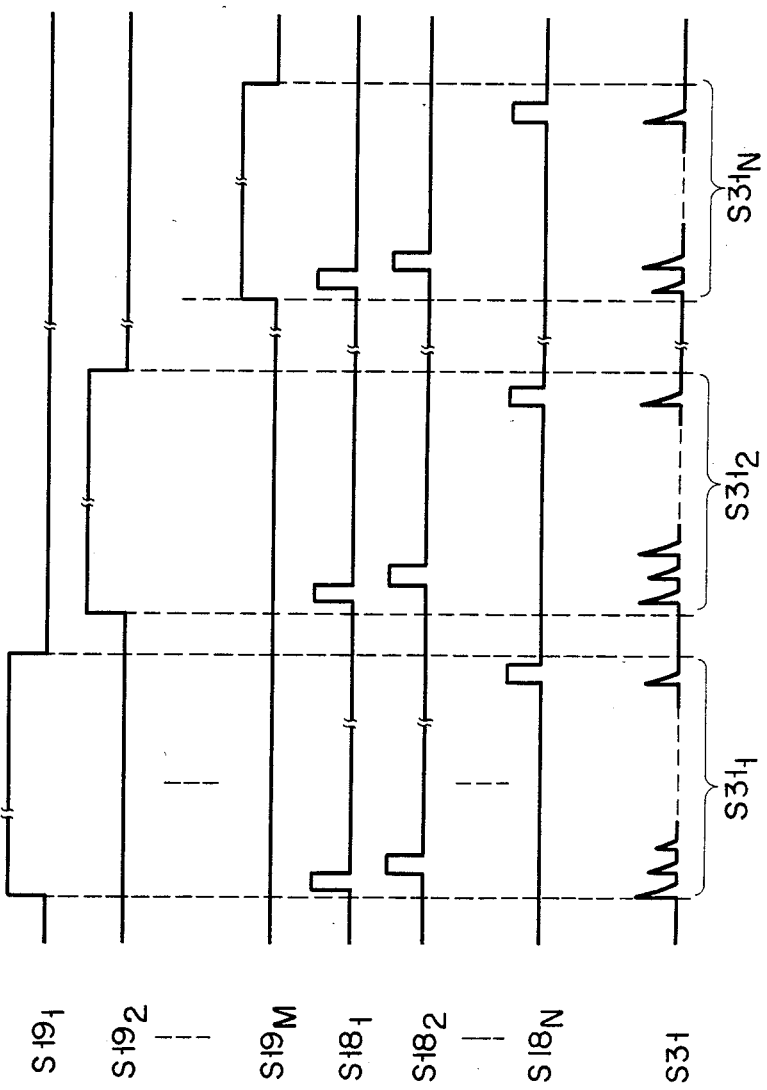
FIG. 2 shows a time chart of scanning signals for driving the image sensor of FIG. 1.

In the normal photographing operation, a photographing mode signal is supplied through a terminal 21A to a mode selection circuit 20. At this time, a low level signal is input to the control terminal 37. The mode selection circuit 20 supplies a driving signal to a horizontal scanning circuit 18 and vertical scanning circuit 19 in response to the photographing mode signal. The horizontal and vertical scanning circuits 18 and 19 supply horizontal and vertical scanning signals $S18_1$ to $S18_N$ and $S19_1$ to $S19_N$ (see FIG. 2) in response to the driving signal. When the vertical scanning signal $S19_1$ is supplied to the line $15_1$ of the image sensing matrix 11, those FETs 13 connected to the line $15_1$ are turned ON. If, in this state, the horizontal scanning signals $S18_1$ to $S18_N$ are sequentially supplied to the FETs $16_1$ to $16_N$, signals on the photoelectric elements (picture elements) corresponding to the line $15_1$ are sequentially supplied to the line $15_1$. Since the output of the inverter 38 is at a high level, the FET 27 is truned ON and the signals on the photoelectric elements 12 are supplied to the image signal pick-up circuit 31. An image signal $S31_1$ (see FIG. 2) corresponding to one scanning line is delivered from the image puck-up circuit 31. Similarly, those image signals $S31_2$ to $S31_N$ corresponding to the other scanning lines $15_2$ to $15_N$ are output from the image pick-up circuit 31. The image signal 31 is supplied to a printer (not shown) where it is reproduced as a photographic image. When the image signal is supplied to a display (not shown) it is displayed as subject image.

Figure 3:
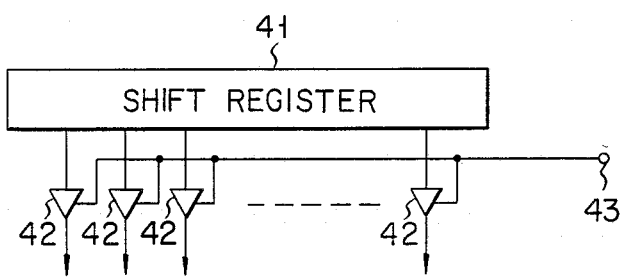
FIG. 3 shows a circuit diagram of a scanning circuit of an image sensor of FIG. 1.

Each of the horizontal and vertical scanning circuits 18 and 19 is comprised of a shift register 41 and tri-state buffers 42 connected to the corresponding output terminals of the shift register 41 as shown in FIG. 3. When a driving signal is supplied from the mode selection circuit to a terminal 43, the impedances of the buffers 42 are decreased and signals are sequentially output, as horizontal scanning signals or vertical scanning signals, from the shift register 41 to the image sensor matrix 11 through the buffers 42.

An explanation will now be given of a photometry mode in which the brightness of the subject is measured before it is photographed. In this case, a photometry mode signal is supplied to the mode selection circuit 20 through the terminal 21B. The mode selection circuit 20 supplies a driving signal to the picture element selection circuits 22. At this time, a high level signal is supplied to the terminals 37, causing the FET 27 to be turned OFF and the FET 32 to be turned ON. If, in this state, address signals are sequentially fed through the terminals $24_1$ to $24_N$ and $25_1$ to $25_M$ to the picture element selection circuits 22 and 23, the picture element selection circuits 22 and 23 simultaneously select all the photoelectric elements 12 in the image sensor matrix 11. The photocurrent Ip of the photoelectric elements 12 flows into the amplifier 33 through the line 17 and FET 32. The photocurrent Ip is converted by the amplifier 33 to a voltage signal. The voltage signal is supplied to an analog meter (not shown) where it is displayed as an amount of exposure. The voltage signal is converted to a digital signal. The digital signal is supplied to a digital meter (not shown) where it is displayed as an amount of exposure. The amount of exposure as displayed on the meter corresponds to the brightness of the subject as a whole. Where the brightness of a specific portion of the subject is to be measured, the address signals corresponding to the specific portion are supplied to the picture element selection circuits 22 and 23. Where the address signals representing, for example, a central portion of the subject are supplied to the circuits 22 and 23, the photocurrents of the photoelectric elements 12 corresponding to the central portion of the image sensor matrix 11 are supplied to the amplifier 33 to permit the rapid measurement of the brightness of the central portion of the subject. When it is desired to measure the brightness of a plurality of specific portions of the subject, this can be done rapidly by selecting the corresponding address signals.

Figure 4:
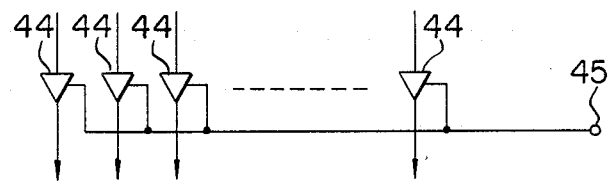
FIG. 4 shows a circuit diagram of a picture element selection circuit of the image sensor of FIG. 1.

Each of the picture element selection circuits 22 and 23 is comprised of a plurality of tri-state buffers, 44, . . . which are connected to the terminals $24_1$ to $24_N$ or $25_1$ to $25_M$ as shown in FIG. 4. When a driving signal is fed from the mode selection circuit 20 through a terminal 45 to the control input terminals of the tri-state buffers 44, . . . , the impedances of the tri-state buffers 44 are lowered, permitting the address signals to pass therethrough.

As will be understood from the above, according to this invention means for freely selecting the photoelectric elements of the image sensor matrix is provided separately from the scanning means, and photographing and photometric operations can be carried out according to the selection of the photographing and photometric modes, respectively. In the photometry mode, a specific portion of the subject can be rapidly and photometrically measured by selecting the corresponding address signals.

Figure 5:
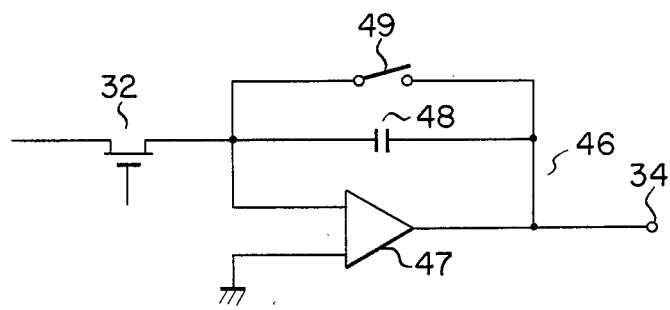
FIG. 5 shows a circuit diagram of a photometry circuit.

Although in the above-mentioned embodiment the photometric signal, i.e., the photocurrent Ip is converted by the amplifier into a voltage signal, it may be supplied to an integrator 46 as shown in FIG. 5 where it is integrated for a predetermined time period to permit an increase in the dynamic range of photometry. The integrator 46 of FIG. 5 comprises an operational amplifier 47 and capacitor 48. A switch 49 is adapted to discharge the capacitor 48 when the integrator 46 reset. In place of the picture element selection circuit a latch circuit may be used which is accessed by the shift register, etc. In this case, it is possible to decrease the number of selection terminals $24_1$ to $24_N$ and $25_1$ to $25_M$.

When the above-mentioned solid state image sensor of this invention is used, a desired portion or portions of the subject can be photometrically measured readily and quickly before a shutter of an electronic camera is released to obtain a still photograph. It is also possible to prevent a photometric miss resulting from, for example, the vibration of the hands of the user. Where the subject is to be accurately photometrically measured, additional sensor elements are often used apart from the image sensor elements used for photographing. According to this invention, however, photographing or photometric measurement is carried out with the same sensor elements, thus assuring a high photometric accuracy. It is possible to freely effect a partial photometric measurement, average photometric measurement, and so on.

What is claimed is:

1. A solid state image sensing apparatus comprising:
    a solid state image sensing means including a plurality of photoelectric elements two-dimensionally disposed in an imaging plane, said photoelectric elements being capable of issuing a signal charge corresponding to the quantity of incident light thereon when the respective photoelectric elements are selected to issue an output;
    first selecting means for sequentially selecting respective ones of said photoelectric elements so as to pickup the signal charge from said selected photoelectric elements in sequence in a first operating mode;
    second selecting means for selecting a plurality of specified photoelectric elements from said photoelectric elements so as to pickup the signal charge therefrom simultaneously in a second operating mode; and
    mode changing means for selectively supplying a mode selection signal to said first and second selecting means so as to carry out the operating mode selection.

2. The solid state image sensing apparatus of claim 1, wherein said first selecting means comprises horizontal scanning means and vertical scanning means, both of said horizontal and vertical scanning means cooperatively selecting said selected photoelectric elements in sequence in said first operating mode so as to obtain an image signal.

3. The solid state image sensing apparatus of claim 1, wherein said second selecting means comprises horizontal position selecting means and vertical position selecting means, both of said horizontal and vertical position selecting means cooperatively selecting said specified photoelectric elements simultaneously in said second operating mode so as to obtain a photometric signal.

4. The solid state image sensing apparatus of claim 1, further comprising:

first output circuit means coupled to said image sensing means for issuing an image signal in said first operating mode;

second output circuit means coupled to said image sensing means for issuing a photometric signal in said second operating mode; and control circuit means for selectively enabling said first output circuit means or said second output circuit means.

5. The solid state image sensing apparatus of claim 2, wherein at least one of said horizontal scanning means and said vertical scanning means comprises a shift register and a plurality of tri-state buffers coupled to said shift register.

6. The solid state image sensing apparatus of claim 3, wherein at least one of said horizontal position selecting means and vertical position selecting means comprises a plurality of tri-state buffers.

* * * * *